United States Patent Office 3,217,012
Patented Nov. 9, 1965

3,217,012
SUBSTITUTED PYRIDINES, PROCESS FOR
AND NEW COMPOSITIONS
Gustave B. Bachman, Lafayette, Ind., and Michael Karickhoff, Circleville, Ohio, assignors to Purdue Research Foundation, West Lafayette, Ind., a corporation of Indiana
No Drawing. Filed Oct. 26, 1960, Ser. No. 65,019
27 Claims. (Cl. 260—296)

This invention relates to direct nuclear substitution of heterocyclic bases and more particularly concerns direct introduction of substituted aminomethyl groups onto a carbon of a pyridine ring to form substituted α-pyridylmethylamines.

Prior art procedures have involved several process steps for the preparation of compounds having limited structural similarity to the compounds prepared herein. This is cumbersome and expensive and results in reduced overall yields. At least as important a consideration is the fact that prior art methods are limited in the specific compounds which may be prepared thereby.

This invention makes possible the preparation of new chemical compounds, some of which are intermediates to new pharmaceutically active compounds, particularly and ultimately new antihistaminic or tuberculostatic compounds. Thus, this invention provides a greatly improved process for preparing compounds old in the art and also provides compounds which are distinguished and inventively new themselves.

It is an object of this invention to provide a method of introducing a substituted aminomethyl group onto a carbon of a pyridine ring directly.

It is another object of the invention to prepare, in a facility and economic manner, compositions having the structure:

(1)

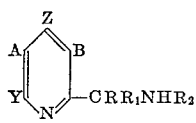

wherein R and $R_1$ may be hydrogen, alkyl radicals, or cyclic hydrocarbon radicals either saturated or unsaturated, halogen and alkoxy substituted cyclic radicals, and $R_2$ is alkyl radicals, or cyclic hydrocarbon radicals either saturated or unsaturated, that is, the R's when hydrocarbon may be saturated or unsaturated, cyclic either aromatic or nonaromatic in character, halogen and alkoxy substituted cyclic radicals. Of course, any of the R's can be an alkyl substituted cyclic radical. The R's when either alkyl or cyclic may be alike, with the provision that at least one of the R's is aromatic in all cases. A, B, Y and Z will be defined hereinafter under the discussion of suitable pyridines.

It is an important object of the invention to provide new compositions of matter having the structure:

(2)

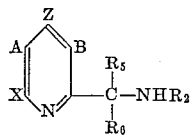

wherein the R's represent members of the respective groups as follows:

$R_5$ represents halogen and alkoxy substituted cyclic radicals. $R_6$ represents H, alkyl radicals, cyclic hydrocarbon radicals both saturated and unsaturated, alkyl substituted cyclic radicals, halogen and alkoxy substituted cyclic radicals. $R_2$ represents the same as in Formula 1. A, B, X and Z are defined hereinafter.

It is still another more particular object of the invention to prepare new compositions of matter having the structure:

(3)

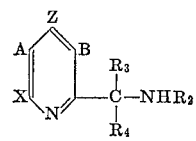

wherein $R_3$ and $R_4$, which may be alike, are selected from alkyl radicals and cyclic hydrocarbon radicals either saturated or unsaturated, alkyl substituted cyclic radicals, halogen and alkoxy substituted cyclic radicals, and where at least one of the R's is aromatic in all cases. The remaining substituents are the same as in the preceding formulas and are defined hereinafter.

It is still a further object of the invention to prepare new histamine antagonists.

Broadly, these and other objects of the invention are accomplished by the reaction of anils or Schiff bases with a pyridine in the presence of aluminum or magnesium metal.

By Schiff bases, we mean imines prepared by the reaction of a primary amine with an aldehyde or a ketone according to well known procedures in the art.

The R's in the preceding formulas are more specifically defined as follows:

When R is an alkyl, it is an aliphatic radical of 1 to 20 carbons, preferably 1 to 12 carbons.
When R is a cyclic hydrocarbon radical, it is a ring of 3 to 7 carbons and preferably is a ring of 6 carbons when either aromatic or nonaromatic.
When R is a combined alkyl and cyclic radical it contains from 7 to 18 carbons and preferably from 7 to 11 carbons.
When R is a halogen substituted cyclic radical, it is a, preferably, halophenyl or halocyclohexyl and more preferably is a chlorophenyl or a chlorocyclohexyl.
When R is an alkoxy substituted cyclic radical, it is an ether of a total of 12 carbons and preferably is an alkoxy radical of 1 to 6 carbons on a phenyl or cyclohexyl group.

Illustrative examples of the compounds contemplated are set forth by the following illustrative examples of the radicals encompassed by the R's taken in conjunction with the formulas and specified restrictions:

N-butyl-1-methyl-1-(4-propylphenyl)-1-(2-pyridyl) methylamine,
N-propyl-1-pentyl-1-(4-dodecylphenyl)-1-(2-pyridyl) methylamine,
N-hexyl-1-phenyl-1-cyclohexyl-1-(2-pyridyl) methylamine,
N-octyl-1-(4-chlorophenyl)-1-(2-cyclohexylethyl)-1-(2-pyridyl) methylamine, N-ethyl-1-(2-ethoxyphenyl)-1-(4-hexylcyclohexyl)-1-(2-pyridyl) methylamine,
N-dodecyl-1-(4-chlorocyclohexyl)-1-phenyl-1-(2-pyridyl) methylamine,
N-butyl-1-(2-butoxyphenyl)-1-(2-pyridyl) methylamine,
N-(4-methylcyclohexyl)-1,1-diphenyl-1-(2-pyridyl) methylamine,
N-(4-propylcyclohexyl)-1-(6-cyclohexylhexyl)-1-phenyl-1-(2-pyridyl) methylamine,
N-cyclohexyl-1-cyclohexyl-1-phenyl-1-(2-pyridyl) methylamine,
N-(4-dodecylcyclohexyl)-1-propyl-1-(2-butylphenyl)-1-(2-pyridyl) methylamine.
N-(2-propylphenyl)-1-ethyl-1-(4-pentoxycyclohexyl)-1-(2-pyridyl) methylamine,
N-(4-octylphenyl)-1-(4-chlorophenyl)-1-(4-propoxyphenyl)-1-(2-pyridyl) methylamine,
N-(12-phenyldodecyl)-1-heptyl-1-(2-hexoxyphenyl)-1-(2-pyridyl) methylamine,
N-(2-dodecylphenyl)-1-ethyl-1-(2-chlorophenyl)-1-(2-pyridyl) methylamine,
N-(2-chlorocyclohexyl)-1-phenyl-1-butyl-1-(2-pyridyl) methylamine,
N-(4-propoxyphenyl)-1-(2-butoxyphenyl)-1-(4-decoxyphenyl)-1-(2-pyridyl) methylamine,
N-(4-hexoxyphenyl)-1,1-diphenyl-1-(2-pyridyl) methylamine,
N-(4-chlorophenyl)-1,1-di(4-chlorophenyl)-1-(2-pyridyl) methylamine.

The invention as contemplated is inclusive of the following materials which, however, are to be considered merely illustrative and not limitative:

Pyridines are preferably employed in excess of stoichiometric amounts and are as follows:

Picolines, lutidines, quinolines, isoquinolines, benzoquinolines, acridines, and Schiff bases are as follows:

N-hexylidene aniline,
N-p-pentylbenzylidene decylamine,
N-butylidene p-hexylphenylamine,
N-(1-ethyloctylidene) aniline,
N-(1-propyl pentylidene) aniline,
N-dodecylidene aniline,
N-(1-hexyl decylidene) aniline,
N-(dicyclohexylmethylene) aniline,
N-(1-cyclohexylidene) p-hexylphenylamine, and
N-octadecylidene aniline.

Preferred pyridine compounds are those not having substituents in the 2-position or in both the 2- and 6-positions, as results would be adversely affected by steric hindrance. On the other hand, pyridines substituted in the 3- or 4-positions will not encounter substantial steric hindrance; and the yields will therefore be correspondingly better. Nevertheless, pyridine compounds having the following general structural formula will be found suitable in this invention:

(4)

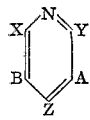

wherein X, Y and Z represent substituents, of which X or Y must be a replaceable hydrogen atom. More fully A, B, X, Y and Z may be H, alkyl, or cyclic hydrocarbon radicals either saturated or unsaturated; X and B, B and Z, Z and A, and A and Y may be joined such as to form a cyclic structure. The alkyl groups above are of 1 to 12 carbons and preferably of 1 to 6 carbons. The first condition, however, must prevail that at least one of X or Y is a replaceable hydrogen.

Best results are usually obtained when the Schiff base is reacted with a pyridine containing no other functional groups, that is, with pyridine itself. Also best results are obtained with aromatic Schiff bases or anils.

The metal catalysts are preferably employed in the form of an amalgam such as may be obtained by heating magnesium with mercuric chloride and a small amount of mercury.

The particular catalyst employed has a significant effect on the reaction, although at this time it is impossible to predict whether aluminum or magnesium is the preferred catalyst for any particular combination of reactants. It is to be noted that it is not strictly correct to call the metals a catalyst, since they are not recovered unchanged as the classic definition demands; but as loosely applied in practice, the metals may be called catalysts and will be here.

Recovery of the products may be accomplished by many methods readily apparent to those skilled in the art. We employ a procedure involving cooling the reaction products, hydrolyzing with a base, acid extracting, basifying, and finally fractionally distilling the nitrogenous products. We, however, have found the preferred method of work-up, when aluminum catalyst is employed, involves first isolating the metallic complex before hydrolyzing by pouring the reaction mixture into petroleum ether, preferably in four to five volumes of the ether. Such a method of work-up results in the advantages of convenient and facility procedures, more rapid results, and a cleaner product compared to direct hydrolysis when aluminum is the catalyst.

While yields of the substituted α-pyridylamine are good, there is nevertheless some (usually 10–20 percent) by-product amine from the reaction in most cases. This by-product amine is the result of reduction of the Schiff base alone. These amines are useful and therefore contribute to the economics of the process in that they are not waste, which can only be discarded.

It may be found helpful to know that the progress of the reaction can usually be observed by the appearance of a color sequence, which ensues when pyridine and Schiff base are added to the catalyst metal. The particular color observed depends on the metal chelate intermediate formed. This coloration can assist an operator engaged in the practice of the process herein; but the process is, in most cases, considered complete when the metal disappears. In any case, the reaction is continued until no further change is observed.

Some heat is generally required to cause initiation of the reaction. This usually is a temperature in the range of 50 to 150° C., and preferably is in the range of 100 to 125° C. Usually about 115° C. will be found sufficient, the most convenient and most preferred. This is easily obtained and held by heating to reflux pyridine.

The substituted α-pyridylamines as prepared according to this invention may be reacted according to prior art teachings such as with β-dimethylaminoethylchloride to form compounds having antihistamine activity. The substituted α-pyridylamines are also intermediates to compounds having tuberculostatic activity more fully described in Belgian Patent No. 584,601. Naturally, some of these componuds will be more active than others.

The compositions of this invention can be tested for the specific antihistamine activity by injecting intravenously into guinea pigs, at a dosage of 4 to 32 mg./kg., and then inject fatal doses of the histamine intravenously until the protection afforded is thereby determined. These compounds have further utility as a corrosion inhibitor of metals particularly when employed with polyhydroxy compounds according to known inhibitor art. The compound can be quaternized by converting by known means in the art, such as, in brief, reacting with an alkyl halide and caustic or at least an alkaline aqueous medium, thereby making the resulting quaternary ammonium compound suitable for a multitude of purposes for which quaternary ammonium compounds are known to be suitable and a commonly used expedient therefor. These compounds are also photographic development accelerators, for example, in the processing of photographic seismograph records.

The equations below will be helpful toward understanding the preparation of the histamine antagonists according to prior art techniques where (2) is more specific:

(5)

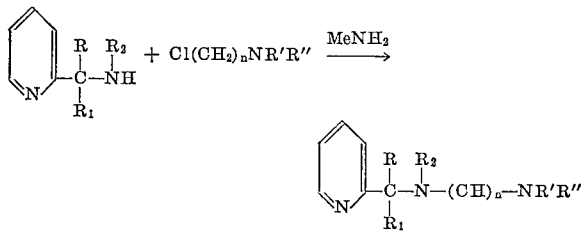

(6)

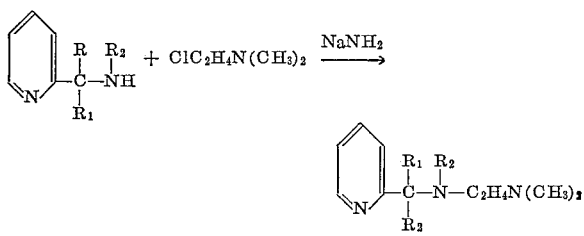

In the above equations, R, $R_1$, and $R_2$ are the same as previously defined herein. R' and R" can be H, an alkyl group of $C_1$ to $C_{20}$ or a cyclic radical either saturated or unsaturated groups are methyl, butyl, dodecyl, cyclohexyl, and phenyl. In the first equation, numbered (5) above, $n$ is an integer which varies from 1 to 20 and preferably from 2 to 10. Me indicates an alkali metal.

In order to disclose more clearly the nature of the present invention and the advantages thereof, reference will hereinafter be made to certain specific embodiments which illustrate the flexibility of the herein described process. It should be clearly understood, however, that this is done solely by way of example and is not to be construed as a limitation upon the spirit and scope of the appended claims.

ILLUSTRATIVE PREPARATION OF SCHIFF BASES

*Preparation of N-benzylidene-aniline.*—Ethanol, 1,000 ml., and water, 500 ml., (64 percent alcohol) were placed in a three-liter, 3-necked flask equipped with a mechanical stirrer and a thermometer which dipped into the reaction mixture. The reaction flask was cooled in an icewater mixture. Freshly distilled benzaldehyde, 400 g. (3.8 moles), was then added in one portion. Aniline, 320 g. (3.5 moles), which had previously been distilled in a nitrogen atmosphere was added dropwise so that the temperature of the reaction mixture remained in the neighborhood of 10°. The addition time was four hours. Stirring was continued for an additional thirty minutes. The precipitated product was filtered with suction, washed several times with an ethanol-water mixture, and dried. The anil, recrystallized twice from ethanol and dried for forty-eight hours in a vacuum desiccator, amounted to 571 g. (3.1 moles) or a 90 percent yield, M.P. 51–52°.

HETEROGENEOUS BIMOLECULAR REDUCTIONS

The anils used in these reductions were prepared as described above. The pyridine used was initially dried over sodium hydroxide pellets, twice distilled from calcium hydride onto calcium hydride and stored over calcium hydride.

*Example 1.—Preparation of N-phenyl-1-phenyl-1(2'-pyridyl)methylamine*

Magnesium turnings, 12.0 g. (0.5 mole), mercuric chloride, 50.0 g. (0.18 mole), and 10 drops of mercury were heated together for two hours at 100°. A mixture of pyridine, 25 g., and N-benzylidene-aniline, 25 g., was added to initiate the reaction. A deep violet color developed immediately which gradually turned to a red-brown color over a period of time. Pyridine, 91.0 g. (1.25 moles), was added and the reaction mixture stirred for twenty minutes. The remainder of the N-benzylidene-aniline, 90.5 g. (0.5 mole total), was added dropwise over a four-hour period. During this period, it was necessary to add more pyridine, 182 g. (2.0 mole), in order to prevent caking in the reaction flask. During the anil addition and for six hours thereafter, heat was supplied so that the pyridine refluxed gently. The partially cooled reaction mixture was poured into a mixture of 500 ml. of 3 N sodium hydroxide and ice, stirred for five hours at room temperature, and then filtered through Celite. The dark organic layer was separated, and the aqueous layer extracted several times with benzene. The combined extracts and organic layer were dried and the excess pyridine and other volatile materials were removed by distillation at aspirator pressures. The resulting red viscous material was distilled rapidly. The boiling point range was 55° to 210° (0.5 mm.). The following fractions were obtained:

| Fraction | B.P., ° C. (mm.) | Amount (grams) |
|---|---|---|
| 1 | 70–118 (1.5) | 2.0 |
| 2 | 117–140 (0.5) | 30.0 |
| 3 | 168–210 (0.5) | 52.0 |
| 4 | Residue | 4.0 |

Redistillation of Fraction 2 through a 30 cm. glass-helix-packed column yielded N-benzylaniline, 15.0 g., B.P. 169–171° (11 mm.), $n_D^{25}$ 1.6115, M.P. of hydrochloride 210–212°. Reported value, B.P. 171.5° (10 mm.), $n_D^{24.8}$ 1.6118, M.P. of hydrochloride, 214–216°. Fraction 3 was redistilled and identified as N-phenyl-1-phenyl-1-(2'pyridyl)methylamine, B.P. 155–162° (0.1 mm.), M.P. of picrate 175°. The yield of the yellow viscous material was 40.0 g. or 48.5 percent.

*Example 2.—Preparation of N-phenyl-1-(2'-chlorophenyl)-1(2"-pyridyl)methylamine*

The following amounts of reactants were used:

| | Grams | Moles |
|---|---|---|
| Aluminum metal | 13.5 | 0.5 |
| Mercuric chloride | 5.0 | 0.018 |
| N-(2-chlorobenzylidene)-aniline | 88.0 | 0.5 |
| Pyridine | 364.0 | 4.0 |

The boiling point range of the red viscous material from the work-up of the reaction mixture was 55 to 200° (0.1 mm.). A non-distillable residue of 50.0 g. was obtained. Decomposition accompanied the initial rapid distillation at the higher temperature. Redistillation yielded the following fractions:

| Fraction | B.P., ° C. (mm.) | Amount (grams) |
|---|---|---|
| 1 | 105–158 (0.1) | 27.0 |
| 2 | 150–155 (0.08) | 8.0 |
| 3 | 180–185 (0.09) | 25.0 |
| 4 | Residue | 3.0 |

Redistillation of Fraction 1 through a 30 cm. glass-helix-packed column gave N-(2-chlorobenzyl) aniline, 15.0 g., B.P. 174–178° (8.0 mm.). Literature value, 325–327°. Fraction 3, a viscous yellow oil, was identified as the desired product, N-phenyl-1-(2'-chlorophenyl)-1-(2"-pyridyl)methylamine, M.P. of picrate 165–166° C. The yield was 17 percent.

*Example 3.—Preparation of N-(4'-chlorophenyl)-1-phenyl-1-(2''-pyridyl)methylamine*

The amounts of reactants employed were as follows:

|  | Grams | Moles |
|---|---|---|
| Magnesium turnings | 12.0 | 0.5 |
| Mercuric chloride | 50.0 | 0.180 |
| N-benzylidene-4-chloroaniline | 96.0 | 0.45 |
| Pyridine | 227.0 | 2.5 |

The anil addition time was three hours. Heating and stirring were continued for six hours after the addition of the anil was complete. The boiling point range on the initial rapid distillation was 110 to 180° (0.12 mm.). A residue of 18 g. was obtained. Redistillation gave the following fractions:

| Fraction | B.P., °C. (mm.) | Amount (grams) |
|---|---|---|
| 1 | 100–158 (.08) | 30.0 |
| 2 | 160–168 (.08) | 18.0 |
| 3 | 168–175 (.08) | 18.0 |
| 4 | 185 (.08) | 1.0 |
| 5 | Residue | 5.0 |

Fraction 1 was redistilled through a small Vigreaux column. The major portion, 25 g., was identified as N-benzyl-p-chloroaniline, B.P. 120–121° (0.1 mm.), M.P. 44°. Reported value: M.P. 45°. On standing, Fraction 3 solidified. Recrystallization from petroleum ether (90–100°) gave a white solid, M.P. 113°, identified as N-(4'-chlorophenyl)-1-phenyl-1-(2''-pyridyl) methylamine, yield 12.7 percent, M.P. of picrate 157–158°.

*Example 4.—Preparation of N-phenyl-1-(4'-chlorophenyl)-1-(2''-pyridyl) methylamine*

Reactants employed were:

|  | Grams | Moles |
|---|---|---|
| Magnesium turnings | 12.0 | 0.5 |
| Mercuric chloride | 50.0 | 0.18 |
| N-(4-chlorobenzylidene) aniline | 109.0 | 0.5 |
| Pyridine | 455.0 | 5.0 |

The anil was added over a four-hour period. The reaction was kept at total reflux for six additional hours. The initial distillation gave a boiling point range of 40 to 190° (.04 mm.) and a residue of 40.0 g. Redistillation gave the following fractions:

| Fraction | B.P., °C. (mm.) | Amount (grams) |
|---|---|---|
| 1 | 30–155 (.06) | 20.0 |
| 2 | 160–165 (.03) | 20.0 |
| 3 | 167–168 | 8.0 |
| 4 | Residue | 5.0 |

Redistillation of Fraction 1 through a 30 cm. glass-helix-packed column did not show any major fraction but rather that the low boiling material was a mixture of impure nitrogenous compounds. Fraction 2 was identified as N-phenyl-1-(4'-chlorophenyl) - 1 - (2''-pyridyl)methylamine, M.P. of picrate 168–169°. The yield was 27.0 percent.

*Example 5.—Preparation of N-phenyl-1-methyl-1-isobutyl-1-(2'-pyridyl)methylamine*

Reactants used were:

|  | Grams | Moles |
|---|---|---|
| Aluminum metal | 13.5 | 0.5 |
| Mercuric chloride | 5.0 | 0.018 |
| 1,3-dimethylbutylideneaniline | 88.0 | 0.5 |
| Pyridine | 200.0 | 0.5 |

The anil addition period was four hours. Heating and stirring were continued for five hours after the anil addition was completed. Rapid distillation of the nitrogenous material gave a boiling point range of 48–208° (0.08 mm.). A residue of 60.0 g. was obtained. Redistillation of the nitrogenous material gave as the major fraction the desired heterogeneously coupled product, N-phenyl-1-methyl- 1 -isobutyl - 1-(2'-pyridyl)methylamine, 120.0 g., B.P., 145° (0.08 mm.). The yield was 10.3 percent. A crystalline picrate derivative could not be obtained on this product.

*Example 6.—Preparation of N-(2'-methoxyphenyl)-1-phenyl-1-(2''-pyridyl)methylamine*

The amounts of reactants employed were:

|  | Grams | Moles |
|---|---|---|
| Magnesium turnings | 12.0 | 0.5 |
| Mercuric chloride | 50.0 | 0.18 |
| N-benzylidene-2-anisidine | 109.0 | 0.5 |
| Pyridine | 342.0 | 3.75 |

The N-benzylidene-2-anisidine was added dropwise over a two and one-half hour period. The contents of the reaction flask were kept at total reflux for five additional hours. A boiling point range of 45–210° (.06 mm.) was obtained on the initial rapid distillation of the reaction products. The low boiling fraction, on distillation through a 30 cm. glass-helix-packed column, gave N-benzyl-2-methoxyaniline, 14.0 g., B.P. 130–132° (1 mm.), M.P. of picrate 135°. Reported values, B.P. 217–220° (25 mm.), M.P. of picrate, 136°. Redistillation of the higher boiling material gave the following fractions:

| Fraction | B.P., °C. (mm.) | Amount (grams) |
|---|---|---|
| 1 | 41–129 (.02) | 1.0 |
| 2 | 129–146 (.02) | 3.0 |
| 3 | 174–183 (.02) | 25.0 |
| 4 | 205–206 (.02) | 6.0 |
| 5 | Residue | 3.0 |

Fraction 3 was identified as the desired heterogeneously coupled product, N-(2'-methoxyphenyl)-1-phenyl-1-(2''-pyridyl)methylamine. It amounted to 25.0 g. or a 27 percent yield, M.P. of picrate 145–146°.

*Example 7.—Preparation of N-(4'-methoxyphenyl)-1-phenyl-1-(2''-pyridyl)methylamine*

The following amounts of reactants were employed:

|  | Grams | Moles |
|---|---|---|
| Magnesium turnings | 12.0 | 0.5 |
| Mercuric chloride | 50.0 | 0.18 |
| N-benzylidene-4-anisidine | 109.0 | 0.5 |
| Pyridine | 455.0 | 5.0 |

The addition period of the anil was three hours. Heating and stirring were continued for five hours. An initial rapid distillation gave a boiling point range of 62 to 210° (.04 mm.). A residue of 15.0 g. was obtained. Fractionation of the lower boiling fraction gave N-benzyl-p-methoxyaniline, 15.0 g., B.P. 136–141° (1 mm.). Reported value, B.P. 236–238° (32 mm.). Redistillation of the higher boiling material gave the following fractions:

| Fraction | B.P., °C. (mm.) | Amount (grams) |
|---|---|---|
| 1 | 56–131 (.03) | 2.0 |
| 2 | 131–146 (.03) | 13.0 |
| 3 | 162–172 (.03) | 8.0 |
| 4 | 181–188 (.03) | 40.0 |
| 5 | Residue | 5.0 |

Fraction 4 was identified as N-(4'-methoxyphenyl)-1-phenyl-1-(2"-pyridyl)-methylamine, M.P. of picrate 130–131°. The yield was 34.2 percent.

*Example 8.—Preparation of N-(2'-chlorophenyl)-1-phenyl-1-(2"-pyridyl)methylamine*

The following amounts of reactants were employed:

|  | Grams | Moles |
|---|---|---|
| Magnesium turnings | 12.0 | 0.5 |
| Mercuric chloride | 50.0 | 0.18 |
| N-benzylidene-2-chloroaniline | 88.0 | 0.5 |
| Pyridine | 328.0 | 3.6 |

Initial distillation gave a boiling point range from 50° to 170° (0.03 mm.) and a tar-like residue of 34.0 g. Redistillation of the lower boiling fractions through a 30 cm. glass-helix-packed column yielded N-benzyl-o-chloroaniline, 14.0 g., B.P. 179–181° (12.0 mm.), M.P. 44–45°. Literature value, M.P. 45°. Redistillation of the higher boiling material yielded the following fractions:

| Fraction | B.P., °C. (mm.) | Amount (grams) |
|---|---|---|
| 1 | 100–150 (0.05) | 1.0 |
| 2 | 150–160 (0.05) | 3.0 |
| 3 | 165–170 (0.05) | 17.0 |
| 4 | Residue | 5.0 |

Fraction 3, a yellow viscous oil which solidified on standing, was identified as the desired heterogeneously coupled product, M.P. of picrate 154°. The yield was 18.1 percent.

*Example 9.—Preparation of N-phenyl-1-methyl-1-hexyl-1-(2'-pyridyl)methylamine*

Reactants employed were:

|  | Grams | Moles |
|---|---|---|
| Magnesium turnings | 12.0 | 0.5 |
| Mercuric chloride | 50.0 | 0.18 |
| N-(1-methylhexylidene)aniline | 102.0 | 0.5 |
| Pyridine | 228.0 | 2.5 |

The anil addition period was four hours followed by a reflux period of ten hours. The initial distillation of the reaction mixture yielded a small amount (5.0 g.) of the monomolecularly reduced anil and a higher boiling fraction of 30.0 g. Redistillation of the latter fraction gave N-phenyl-1-methyl-1-hexyl-1-(2'-pyridyl)methylamine, 12.0 g., B.P. 140–143° (0.03 mm.). A crystalline picrate of this material could not be obtained. The yield was 13.8 percent.

*Example 10.—Preparation of N-phenyl-1,1-diphenyl-1-(2'-pyridyl)methylamine*

Reactants used were:

|  | Grams | Moles |
|---|---|---|
| Magnesium turnings | 12.0 | 0.5 |
| Mercuric chloride | 50.0 | 0.18 |
| Benzophenone-anil | 103.0 | 0.4 |
| Pyridine | 256.0 | 3.25 |

The anil addition period of four hours was followed by a heating and reflux period of six hours. Work-up and subsequent distillation of the nitrogenous material gave the following fractions:

| Fraction | B.P., °C. (mm.) | Amount (grams) |
|---|---|---|
| 1 | 50–115 (.05) | 10.0 |
| 2 | 130–140 (.07) | 30.0 |
| 3 | Residue | 20.0 |

Redistillation of Fraction 1 through a 30 cm. glass-helix-packed column gave benzohydrylaniline, 6.0 g., B.P. 135–140° (.05 mm.), M.P. 60°. Reported values, B.P. 232–234° (20.0 mm.), M.P. 58°. Redistillation of Fraction 2 yielded the desired heterogeneously coupled product, 30.0 g., B.P. 158–161° (.05 mm.), M.P. of picrate 195°. The yield was 28.6 percent.

Other illustrative examples of the present process, the identity, and properties of compounds prepared can be found in Tables I and II below:

TABLE I.—SUBSTITUTED 2-PYRIDYLMETHYLAMINES PREPARED AND THEIR DERIVATIVES

| No. | (pyridyl)-CRR₁NHR₂ | | | Yield, Percent | | B.P. | | M.P., °C. | |
|---|---|---|---|---|---|---|---|---|---|
|  | R | R₁ | R₂ | Al | Mg | °C. | (mm.) | Product | Picrate |
| 1 | Phenyl | Phenyl | Phenyl | 10.6 | 75.0 | 156 | (.08) | 53 |  |
| 2 | do | Hydrogen | do | 18.8 | 48.5 | 158 | (.01) | 78 | 175 |
| 3 | do | do | p-Chlorophenyl | 19.2 | 12.7 | 171 | (.08) | 113 | 158 |
| 4 | do | do | o-Chlorophenyl | 0 | 18.1 | 168 | (.05) | 100 | 154 |
| 5 | do | do | p-Tolyl | 34.5 | 34.5 | 166 | (.03) | 81 | 128 |
| 6 | do | do | o-Tolyl | 19.2 | 70.0 | 161 | (.01) | Oil | 156 |
| 7 | do | do | p-Anisyl |  | 34.2 | 185 | (.03) | 91 | 131 |
| 8 | do | do | o-Anisyl |  | 27.2 | 176 | (.02) | Oil | 146 |
| 9 | p-Chlorophenyl | do | Phenyl | 20.0 | 27.0 | 163 | (.03) | 80 | 169 |
| 10 | o-Chlorophenyl | do | do | 17.8 | 0 | 183 | (.09) | 96 | 163 |
| 11 | p-Tolyl | do | do | 20.0 | 47.5 | 167 | (.02) | Oil | 163 |
| 12 | Phenyl | do | Benzyl | 38.4 | 0 | 184 | (.03) | Oil | 131 |
| 13 | do | do | Ethyl | 36.8 | 14.9 | 106 | (.50) | Oil | 150 |
| 14 | do | do | Methyl | 30.0 |  | 122 | (.50) | Oil | 195 (b). |
| 15 | Methyl | Isobutyl | Phenyl | 10.3 | 0 | 145 | (.08) | Oil | Oil |
| 16 | do | Hexyl | do | 0 | 13.8 | 141 | (.03) | Oil | Oil |

TABLE II.—ELEMENTAL ANALYSIS OF THE SUBSTITUTED 2-PYRIDYL METHYLAMINES AND THEIR DERIVATIVES

| No. | Formula | Carbon, percent | | Hydrogen, percent | | Nitrogen, percent | |
|---|---|---|---|---|---|---|---|
| | | Calcd. | Found | Calcd. | Found | Calcd. | Found |
| 1 | $C_{24}H_{20}N_2$ | 85.68 | 85.63 | 5.99 | 6.01 | 8.33 | 7.98 |
| 2 | $C_{18}H_{18}N_2$ | 83.04 | 83.10 | 6.20 | 6.47 | 10.76 | 10.65 |
| 3 | $C_{18}H_{15}N_2Cl$ | 73.34 | 73.41 | 5.14 | 5.30 | 9.51 | 9.35 |
| 4 | $C_{18}H_{15}N_2Cl$ | 73.34 | 73.63 | 5.14 | 5.40 | 9.51 | 9.48 |
| 5 | $C_{19}H_{18}N_2$ | 83.17 | 82.90 | 6.61 | 6.76 | 10.21 | 10.25 |
| 6 | $C_{19}H_{18}N_2$ | 83.17 | 83.00 | 6.61 | 6.38 | 10.21 | 10.36 |
| 7 | $C_{19}H_{18}N_2O$ | 78.59 | 78.76 | 6.25 | 6.48 | 9.65 | 9.79 |
| 8 | $C_{19}H_{18}N_2O$ | 78.59 | 78.73 | 6.25 | 6.25 | 9.65 | 9.57 |
| 9 | $C_{18}H_{15}N_2Cl$ | 73.34 | 73.60 | 5.14 | 5.40 | 9.51 | 9.61 |
| 10 | $C_{18}H_{15}N_2Cl$ | 73.34 | 73.44 | 5.14 | 4.99 | 9.51 | 9.54 |
| 11 | $C_{19}H_{18}N_2$ | 83.17 | 83.00 | 6.61 | 6.40 | 10.21 | 10.36 |
| 12 | $C_{19}H_{18}N_2$ | 83.17 | 82.90 | 6.61 | 6.45 | 10.21 | 10.04 |
| 13 | $C_{14}H_{16}N_2$ | 79.21 | 79.51 | 7.60 | 7.44 | 13.20 | 13.12 |
| 14 | $C_{13}H_{14}N_2$ | 78.75 | 78.59 | 7.12 | 7.26 | 14.13 | 13.99 |
| 15 | $C_{17}H_{22}N_2$ | 80.27 | 80.42 | 8.72 | 8.95 | 11.01 | 11.09 |
| 16 | $C_{19}H_{26}N_2$ | 80.80 | 81.08 | 9.28 | 9.11 | 9.92 | 10.02 |

PROCEDURE FOR HISTAMINE ANTAGONISTS

*Preparation of 2 - (α - [N-(2-dimethylaminoethyl)-N-phenylamino]benzyl) pyridine or 1-(α-pyridyl)-1,2 diphenyl-5-methyl-2,5-diazahexane.*—A solution of N-phenyl - 1 - phenyl-1-(2'-pyridyl)methylamine, 26.0 g. (0.1 mole), in dry toluene, 50 ml., was added to a stirred solution of sodamide, 7.8 g. (0.2 mole), in toluene, 50 ml. at 100°. The mixture was heated on a steam bath for three hours and then treated with a toluene solution of β-dimethylamino-ethyl chloride, 27.4 g. (0.19 mole). The reaction mixture was heated and stirred for an additional twenty-four hours. The cooled reaction mixture was washed with water and the toluene layer separated. The aqueous layer was saturated with potassium carbonate and then extracted with toluene. The combined toluene extracts were dried and distilled. After an initial rapid distillation the crude product was twice distilled using a 12-inch unpacked column. The desired pyridyl derivative was obtained distilling at 160–163° (0.03 mm.). It amounted to 10 g. or a 33.3 percent yield.

While particular embodiments of the invention have been described, it will be understood, of course, that the invention is not limited thereto, since many modifications may be made; and it is therefore contemplated to cover by the appended claims any such modifications as fall within the true spirit and scope of the invention.

The invention having thus been described, what is claimed and desired to be secured by Letters Patent is:

1. A process for preparing substituted α-aminomethyl substituted-pyridines of the formula:

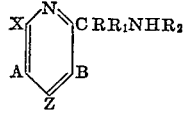

wherein R and $R_1$ are selected from the group consisting of hydrogen, alkyl of 1 to 20 carbons, alkenyl of 1 to 20 carbons, cyclohexyl, cycloalkenyl of 6 carbons, phenyl, alkylcyclohexyl of 7 to 18 carbons, alkylcyclohexenyl of 7 to 18 carbons, alkenylcyclohexyl of 7 to 18 carbons, alkenylcyclohexenyl of 7 to 18 carbons, alkylphenyl of 7 to 18 carbons, halocyclohexyl, halocyclohexenyl, halophenyl, alkoxycyclohexyl of 7 to 12 carbons, alkoxycyclohexenyl of 7 to 12 carbons, and alkoxyphenyl of 7 to 12 carbons; $R_2$ is selected from the group consisting of alkyl of 1 to 20 carbons, alkenyl of 1 to 20 carbons, cyclohexyl, cyclohexenyl, phenyl, alkylcyclohexyl of 7 to 18 carbons, alkylcyclohexenyl of 7 to 18 carbons, alkenylcyclohexyl of 7 to 18 carbons, alkenylcyclohexenyl of 7 to 18 carbons, alkylphenyl of 7 to 18 carbons, halocyclohexyl, halocyclohexenyl, halophenyl, alkoxycyclohexyl of 7 to 12 carbons, alkoxycyclohexenyl of 7 to 12 carbons, alkoxyphenyl of 7 to 12 carbons, with the further provision that at least one R is phenyl, and A, B, X and Z are members selected from the group consisting of hydrogen, alkyl of 1 to 12 carbons, alkenyl of 1 to 12 carbons, cyclohexyl, cyclohexenyl and phenyl, said process comprising reacting a Schiff base of the formula:

$$RR_1C=NR_2$$

wherein R, $R_1$ and $R_2$ are the same as above defined, with a monocyclic pyridine of the formula:

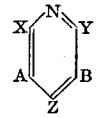

wherein A, B, X, and Z are the same as above and Y is selected from the same group as X and Z, with the further provision that one of X and Y must be hydrogen, in the presence of a metal having an atomic number varying between 12 and 13, inclusively.

2. The process according to claim 1 wherein the reaction is conducted at a temperature within the range of about 50 to about 150° C.

3. The process according to claim 1 wherein the reaction is conducted at a temperature within the range of about 100 to about 125° C.

4. A process according to claim 2 wherein the metal has an atomic number of 12.

5. A process according to claim 2 wherein the metal has an atomic number of 13.

6. Composition of matter of the formula:

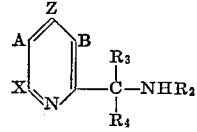

wherein A, B, X and Z are selected from the group consisting of hydrogen, alkyl of 1 to 12 carbons, alkenyl of 1 to 12 carbons, cyclohexyl, cycloalkenyl of 6 carbons and phenyl; wherein $R_3$ and $R_4$ are selected from the group consisting of alkyl of 1 to 20 carbons, alkenyl of 1 to 20 carbons, cyclohexyl, cycloalkenyl of 6 carbons, phenyl, alkylcyclohexyl of 7 to 18 carbons, alkylcyclohexenyl of 7 to 18 carbons, alkenylcyclohexyl of 7 to 18 carbons, alkenylcyclohexenyl of 7 to 18 carbons, alkylphenyl of 7 to 18 carbons, halocyclohexyl, halocyclohexenyl, halophenyl, alkoxycyclohexyl of 7 to 12 carbons, alkoxycyclohexenyl of 7 to 12 carbons, and alkoxyphenyl of 7 to 12 carbons; $R_2$ is selected from the group consisting of alkyl of 1 to 20 carbons, alkenyl of 1 to 20 carbons, cyclohexyl, cycloalkenyl of 6 carbons, phenyl, alkylcyclohexyl of 7 to 18 carbons, alkylcyclohexenyl of 7 to 18 carbons, alkenylcyclohexyl of 7 to 18 carbons, alkenylcyclohexenyl of 7 to 18 carbons, alkylphenyl of 7 to 18 carbons, halocyclohexyl, halocyclohexenyl of 6 carbons, halophenyl, alkoxycyclohexyl of 7 to 12 carbons, alkoxycyclohexenyl of 7 to 12 carbons, alkoxyphenyl of 7 to 12 carbons; with the further provision that at least one R is phenyl.

7. Composition according to claim 6 wherein said A, B, X and Z are selected from the group consisting of hydrogen, alkyl of 1 to 6 carbons, alkenyl of 1 to 6 carbons, cyclohexyl, cycloalkenyl of 6 carbons and phenyl; wherein said $R_3$ and $R_4$ are selected from the group consisting of alkyl of 1 to 12 carbons, alkenyl of 1 to 12 carbons, cyclohexyl, cyclohexenyl of 6 carbons, phenyl, alkylcyclohexyl of 7 to 11 carbons, alkylcyclohexenyl of 7 to 11 carbons, alkenylcyclohexyl of 7 to 11 carbons, alkenylcyclohexenyl of 7 to 11 carbons, alkylphenyl of 7 to 11 carbons, chlorocyclohexyl, chlorocyclohexenyl, chlorophenyl, alkoxycyclohexyl of 7 to 12 carbons, alkoxycyclohexenyl of 7 to 12 carbons; said $R_2$ is selected from the group consisting of alkyl of 1 to 12 carbons, alkenyl of 1 to 12 carbons, cyclohexyl, cycloalkenyl of 6 carbons, phenyl, alkylcyclohexyl of 7 to 11 carbons, alkylcyclohexenyl of 7 to 11 carbons, alkenylcyclohexyl of 7 to 11 carbons, alkenylcyclohexenyl of 7 to 11 carbons, alkylphenyl of 7 to 11 carbons, chlorocyclohexyl, chlorocyclohexenyl, chlorophenyl, alkoxycyclohexyl of 7 to 12 carbons, alkoxycyclohexenyl of 7 to 12 carbons, and alkoxyphenyl of 7 to 12 carbons.

8. Composition of matter of the formula:

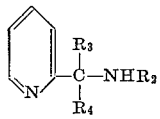

wherein $R_3$ and $R_4$ are selected from the group consisting of alkyl of 1 to 20 carbons, alkenyl of 1 to 20 carbons, cyclohexyl, cyclohexenyl, alkylcyclohexyl of 7 to 18 carbons, alkylcyclohexenyl of 7 to 18 carbons, alkenylcyclohexyl of 7 to 18 carbons, alkenylcyclohexenyl of 7 to 18 carbons, alkylphenyl of 7 to 18 carbons, halocyclohexyl, halocyclohexenyl, halophenyl, alkoxycyclohexyl of 7 to 12 carbons, alkoxycyclohexenyl of 7 to 12 carbons, alkoxyphenyl of 7 to 12 carbons; $R_2$ is selected from the group consisting of alkyl of 1 to 20 carbons, alkenyl of 1 to 20 carbons, cyclohexyl, cyclohexenyl, phenyl, alkylcyclohexyl of 7 to 18 carbons, alkylcyclohexenyl of 7 to 18 carbons, alkenylcyclohexyl of 7 to 18 carbons, alkenylcyclohexenyl of 7 to 18 carbons, alkylphenyl of 7 to 18 carbons, halocyclohexyl, halocyclohexenyl, halophenyl, alkoxycyclohexyl of 7 to 12 carbons, alkoxycyclohexenyl of 7 to 12 carbons, alkoxyphenyl of 7 to 12 carbons; with the further provision that at least one R is phenyl.

9. Composition according to claim 8 wherein said $R_3$ and $R_4$ are selected from the group consisting of alkyl of 1 to 12 carbons, alkenyl of 1 to 12 carbons, cyclohexyl, cyclohexenyl, phenyl, alkylcyclohexyl of 7 to 11 carbons, alkylcyclohexenyl of 7 to 11 carbons, alkenylcyclohexyl of 7 to 11 carbons, alkenylcyclohexenyl of 7 to 11 carbons, alkylphenyl of 7 to 11 carbons, chlorocyclohexyl, chlorocyclohexenyl, chlorophenyl, alkoxycyclohexyl of 7 to 12 carbons, alkoxycyclohexenyl of 7 to 12 carbons, alkoxyphenyl of 7 to 12 carbons; said $R_2$ is selected from the group consisting of alkyl of 1 to 12 carbons, alkenyl of 1 to 12 carbons, cyclohexyl, cyclohexenyl, phenyl, alkylcyclohexyl of 7 to 11 carbons, alkylcyclohexenyl of 7 to 11 carbons, alkenylcyclohexyl of 7 to 11 carbons, alkenylcyclohexenyl of 7 to 11 carbons, alkylphenyl of 7 to 11 carbons, chlorocyclohexyl, chlorocyclohexenyl, chlorophenyl, alkoxycyclohexyl of 7 to 12 carbons, alkoxycyclohexenyl of 7 to 12 carbons, alkoxyphenyl of 7 to 12 carbons.

10. N - phenyl-1-(2' - chlorophenyl) - 1-(2''-pyridyl)methylamine.
11. N - (4' - chlorophenyl) - 1-phenyl-1-(2''-pyridyl)methylamine.
12. N - phenyl - 1-(4' - chloropenyl) - 1-(2''-pyridyl)methylamine.
13. N - phenyl - 1-methyl - 1-isobutyl - 1-(2'-pyridyl)methylamine.
14. N-(2' - methoxyphenyl) - 1-phenyl - 1-(2''-pyridyl)methylamine.
15. N - (4' - methoxyphenyl)-1-phenyl-1-(2''-pyridyl)methylamine.
16. N - (2' - chlorophenyl) - 1-phenyl - 1-(2''-pyridyl)methylamine.
17. N - phenyl - 1 - methyl - 1-hexyl - 1-(2'-pyridyl)methylamine.
18. N - phenyl - 1,1-diphenyl - 1-(2'-pyridyl)methylamine.

19. A process of preparing α-pyridylmethylamines which comprises reacting a monocyclic pyridine with a carbocyclic aromatic Schiff base in the presence of a metal having an atomic number varying from 12 to 13.

20. A process according to claim 19 wherein the aromatic ring in said aromatic Schiff base is attached to the methylenic carbon thereof.

21. A process according to claim 19 wherein the aromatic ring in the said aromatic Schiff base is attached to the nitrogen atom thereof.

22. A process according to claim 19 wherein the aromatic ring of said aromatic Schiff base is nuclearly chlorinated.

23. A process according to claim 19 wherein said aromatic Schiff base has an alkoxy of 1 to 6 carbons on the aromatic ring thereof.

24. A process according to claim 19 wherein said pyridine is a picoline.

25. A process according to claim 19 wherein said pyridine is a lutidine.

26. The process according to claim 19 wherein the reaction is conducted at a temperature within the range of about 50 to about 150° C.

27. The process according to claim 19 wherein the reaction is conducted at a temperature within the range of about 100 to about 125° C.

References Cited by the Examiner
UNITED STATES PATENTS 2,797,224   6/57   Offe _____ 260—296
2,981,737   4/61   Godefroi _____ 260—296

OTHER REFERENCES

Passerini et al., Chem. Abstracts, vol. 30. cols. 3817–18 (1936)
Schwetliek et al., Chem. Abstracts, vol. 52, col. 6343 (1958)
Tilford et al., J. Am. Chem. Soc., Col. 70, pages 4001–9 (1948).

WALTER A. MODANCE, *Primary Examiner.*
DUVAL T. McCUTCHEN, WALTER A. MODANCE, *Examiner.*